US009952463B2

(12) United States Patent
Chen et al.

(10) Patent No.: US 9,952,463 B2
(45) Date of Patent: Apr. 24, 2018

(54) TOUCH PANEL FOR NARROWING BEZEL REGION AND TOUCH DISPLAY DEVICE USING THE SAME

(71) Applicants: INTERFACE OPTOELECTRONICS (SHENZHEN) CO., LTD., Guangdong (CN); GENERAL INTERFACE SOLUTION LIMITED, Miaoli County (TW)

(72) Inventors: Chin-Yuan Chen, Guangdong (CN); Ping-Yang Chen, Guangdong (CN)

(73) Assignees: Interface Optoelectronics (Shenzhen) Co., Ltd., Guangdong (CN); General Interface Solution Limited, Miaoli County (TW)

( * ) Notice: Subject to any disclaimer, the term of this patent is extended or adjusted under 35 U.S.C. 154(b) by 68 days.

(21) Appl. No.: 15/180,323

(22) Filed: Jun. 13, 2016

(65) Prior Publication Data

US 2017/0139252 A1    May 18, 2017

(30) Foreign Application Priority Data

Nov. 13, 2015    (CN) .......................... 2015 1 0780954

(51) Int. Cl.
| | |
|---|---|
| *G02F 1/133* | (2006.01) |
| *G02F 1/1333* | (2006.01) |
| *G02F 1/1335* | (2006.01) |
| *G02F 1/1343* | (2006.01) |
| *G02F 1/1345* | (2006.01) |

(52) U.S. Cl.
CPC ...... *G02F 1/13338* (2013.01); *G02F 1/13439* (2013.01); *G02F 1/13458* (2013.01); *G02F 1/133528* (2013.01); *G02F 2202/28* (2013.01)

(58) Field of Classification Search
CPC ............. G02F 1/13338; G02F 1/13439; G02F 1/133528; G02F 1/13458; G06F 2203/04111; G06F 2203/04104; G06F 3/041; G06F 2203/04103; H05K 1/0283; H05K 2201/048; H05K 2201/09072
See application file for complete search history.

(56) References Cited

U.S. PATENT DOCUMENTS

| | | | | |
|---|---|---|---|---|
| 2012/0073866 | A1* | 3/2012 | Hirai ...................... | G06F 3/044 174/257 |
| 2013/0321311 | A1* | 12/2013 | Aoki ...................... | G06F 3/041 345/173 |
| 2016/0070396 | A1* | 3/2016 | Horade .................. | G06F 3/044 345/174 |

* cited by examiner

*Primary Examiner* — Liliana Cerullo
(74) *Attorney, Agent, or Firm* — Rosenberg, Klein & Lee

(57) ABSTRACT

A touch panel for narrowing bezel region and a touch display device using the same is disclosed. The touch panel includes a first transparent substrate, a first conduction layer, a transparent optical glue layer, a second transparent substrate and a second conduction layer from bottom to top. A bezel region of the first transparent substrate is provided with first conduction pads respectively connected with second conduction pads respectively through first conduction wires. The second transparent substrate is provided with third conduction pads. The second transparent substrate is penetrated with penetrating holes respectively arranged over the second conduction pads and respectively neighboring the third conduction pads. A third conduction layer is arranged on the third conduction pads and fills the penetrating holes. The second conduction pads are respectively connected with the third conduction pads through the third conduction layer in the penetrating holes.

34 Claims, 6 Drawing Sheets

TOUCH PANEL FOR NARROWING BEZEL REGION AND TOUCH DISPLAY DEVICE USING THE SAME

This application claims priority for China patent application no. 201510780954.3 filed on Nov. 13, 2015, the content of which is incorporated by reference in its entirely.

BACKGROUND OF THE INVENTION

Field of the Invention

The present invention relates to a touch panel and a touch display device, particularly to a touch panel for narrowing bezel region and a touch display device using the same.

Description of the Related Art

In recent years, touch panels have been extensively applied in various types of electronic appliances, such as GPS, PDA, cellular phone, and Hand-held PC, to replace traditional input devices (keyboards and mice, for instance). This design greatly improves the accessibility of the interfaces of electronic apparatuses. In addition, since the traditional input devices are no longer required, there is more space for installing display panels of larger size, which makes it rather convenient for users to browse data.

At present, touch panels are mainly categorized into resistance type touch panels, capacitance type touch panels, surface acoustic wave touch panels and optics touch panels. The touch panels are fabricated in different ways taking consideration of driving manner and structural design. For example, the resistance type touch panels include eight-wire, seven-wire, six-wire, five-wire, four-wire and digital resistive touch panels; the capacitance type touch panels include projected capacitive, surface capacitive, and digital capacitive (multitouch capacitive) touch panels; the optics touch panels include interrupted infrared ray (IR) and frustrated total reflection touch panels. The projected capacitive touch screen determines whether to be touched by detecting coupling capacitances between driving electrodes and receiving electrodes. Usually, the projected capacitive touch screens are categorized into touch screens with double conduction layers and touch screens with a single conduction layer. For example, the double conduction layers refer to a double indium tin oxide (DITO), and the single conduction layer refers to a single indium tin oxide (SITO). The DITO structure is shown in FIG. 1. The projected capacitive touch screen includes a first transparent substrate 10, a second transparent substrate 12, a receiving electrode layer 14, a driving electrode layer 16, a transparent optical glue layer 18 and a cover 20 from bottom to top. The first transparent substrate 10 has a sensing region and a bezel region surrounding the sensing region. The driving electrode layer 16 includes a plurality of electrode serials and a plurality of wires. The electrode serials are arranged on the sensing region, and the wires are arranged on the bezel region. Similarly, the second transparent substrate 12 has a sensing region and a bezel region surrounding the sensing region. The receiving electrode layer 14 includes a plurality of electrode serials and a plurality of wires. The electrode serials are arranged on the sensing region, and the wires are arranged on the bezel region. However, since all the wires are arranged on a plane, shortening width and spacing of the wires to narrow the bezel region is more and more difficult.

To overcome the abovementioned problems, the present invention provides a touch panel for narrowing bezel region and a touch display device using the same, so as to solve the afore-mentioned problems of the prior art.

SUMMARY OF THE INVENTION

A primary objective of the present invention is to provide a touch panel for narrowing bezel region and a touch display device using the same, which uses a plurality of penetrating hole to penetrate through a second transparent substrate, and which uses conduction material as conduction mediums between upper and lower conduction wires lapping over each other, so as to form lapping wires with double layers, and which uses upper and lower layers to share more wires possessed by a plane to reduce a bezel region of each plane, thereby achieving the requirement for narrowing bezel.

To achieve the abovementioned objectives, the present invention provides a touch panel for narrowing bezel region, which comprises a first transparent substrate, a first conduction layer, a transparent optical glue layer, a second transparent substrate, a second conduction layer and a third conduction layer. A top surface of the first transparent substrate has a first sensing region and a first bezel region surrounding the first sensing region. The first bezel region is provided with a plurality of first conduction pads, a plurality of first conduction wires and a plurality of second conduction pads. The first conduction pads are respectively connected with the second conduction pads respectively through the first conduction wires. The first conduction layer is arranged on the first sensing region. The transparent optical glue layer is arranged on the first conduction layer and the first transparent substrate. The second transparent substrate is arranged on the transparent optical glue layer, and a top surface of the second transparent substrate has a second sensing region and a second bezel region surrounding the second sensing region, and the second bezel region is penetrated with a plurality of penetrating holes, and the penetrating holes are respectively arranged over the second conduction pads. The second conduction layer is arranged on the second sensing region, and the second bezel region is provided with a plurality of third conduction pads respectively neighboring the penetrating holes and connected with the second conduction layer. The third conduction layer is arranged on the third conduction pads and fills the penetrating holes, and the second conduction pads are respectively connected with the third conduction pads through the third conduction layer in the penetrating holes. The second conduction layer extends to the second bezel region, and the second conduction layer is arranged between the third conduction pads and the second transparent substrate. The third conduction pads and the penetrating holes are arranged in an alternative way. The second bezel region is provided with a plurality of fourth conduction pads and a plurality of second conduction wires, and the second bezel region is penetrated with a penetrating opening, and the first bezel region is provided with a plurality of fifth conduction pads, and a position of the penetrating opening corresponds to the positions of the fifth conduction pads, and the fourth conduction pads are connected with the penetrating opening respectively through the second conduction wires, and the third conduction layer fills the penetrating opening, and the second conduction wires are respectively connected with the fifth conduction pads through the third conduction layer in the penetrating opening. The second conduction layer extends to the second bezel region, and the second conduction layer is arranged between the fourth conduction pads and the second transparent substrate. The fourth conduction pads, the second conduction wires and the fifth conduction pads comprise metal or indium tin oxide (ITO). Each penetrating hole, each second conduction pad and each third conduction pad have shapes of rectangles, and long sides of each second conduction pad are vertical to the first sensing region, and long sides of each third conduction pad are vertical to the second sensing region, and the neighboring rectangles are parallel to each other. The third conduction layer has a width of larger than 60 um overlapping each third conduction pad in a direction from the penetrating hole to the third conduction pad. Each third conduction pad has a width of larger than 100 um overlapping the second conduction pad corresponded thereof. Each third conduction pad has a width of larger than 80 um. The nearest horizontal distance between each penetrating hole and the third conduction pad neighboring thereto is larger than 80 um. Each penetrating hole has a width of larger than 0 um and less than 300 um. A height between a bottom surface of the transparent optical glue layer and a top surface of the third conduction pad above is larger than 0 um and less than 30 um. The third conduction layer has the largest thickness larger than the height. The first conduction layer and the second conduction layer are transparent conduction layers. The transparent conduction layers comprise ITO. The first conduction pads, the first conduction wires, the second conduction pads, the third conduction pads, the third conduction layer comprise metal or ITO. The first transparent substrate and the second transparent substrate are transparent insulation substrates.

The present invention also provides a touch display device, which comprises a lower transparent substrate, a first polarizer, a liquid crystal layer, an upper transparent substrate, a second polarizer, a first transparent substrate, a first conduction layer, a transparent optical glue layer, a second transparent substrate, a second conduction layer and a third conduction layer. The first polarizer is arranged on a bottom surface of the lower transparent substrate. The liquid crystal layer is arranged on a top surface of the lower transparent substrate. The upper transparent substrate is arranged on the liquid crystal layer. The second polarizer is arranged on the upper transparent substrate. The first transparent substrate is arranged on the second polarizer. A top surface of the first transparent substrate has a first sensing region and a first bezel region surrounding the first sensing region. The first bezel region is provided with a plurality of first conduction pads, a plurality of first conduction wires and a plurality of second conduction pads. The first conduction pads are respectively connected with the second conduction pads respectively through the first conduction wires. The first conduction layer is arranged on the first sensing region. The transparent optical glue layer is arranged on the first conduction layer and the first transparent substrate. The second transparent substrate is arranged on the transparent optical glue layer, and a top surface of the second transparent substrate has a second sensing region and a second bezel region surrounding the second sensing region, and the second bezel region is penetrated with a plurality of penetrating holes, and the penetrating holes are respectively arranged over the second conduction pads. The second conduction layer is arranged on the second sensing region, and the second bezel region is provided with a plurality of third conduction pads respectively neighboring the penetrating holes and connected with the second conduction layer. The third conduction layer is arranged on the third conduction pads and fills the penetrating holes, and the second conduction pads are respectively connected with the third conduction pads through the third conduction layer in the penetrating holes. The second conduction layer extends to the second bezel region, and the second conduction layer is arranged between the third conduction pads and the second transparent substrate. The third conduction pads and the penetrating holes are arranged in an alternative way. The second bezel region is provided with a plurality of fourth conduction pads and a plurality of second conduction wires, and the second bezel region is penetrated with a penetrating opening, and the first bezel region is provided with a plurality of fifth conduction pads, and a position of the penetrating opening corresponds to the positions of the fifth conduction pads, and the fourth conduction pads are connected with the penetrating opening respectively through the second conduction wires, and the third conduction layer fills the penetrating opening, and the second conduction wires are respectively connected with the fifth conduction pads through the third conduction layer in the penetrating opening. The second conduction layer extends to the second bezel region, and the second conduction layer is arranged between the fourth conduction pads and the second transparent substrate. The fourth conduction pads, the second conduction wires and the fifth conduction pads comprise metal or indium tin oxide (ITO). Each penetrating hole, each second conduction pad and each third conduction pad have shapes of rectangles, and long sides of each second conduction pad are vertical to the first sensing region, and long sides of each third conduction pad are vertical to the second sensing region, and the neighboring rectangles are parallel to each other. The third conduction layer has a width of larger than 60 um overlapping each third conduction pad in a direction from the penetrating hole to the third conduction pad. Each third conduction pad has a width of larger than 100 um overlapping the second conduction pad corresponded thereof. Each third conduction pad has a width of larger than 80 um. The nearest horizontal distance between each penetrating hole and the third conduction pad neighboring thereto is larger than 80 um. Each penetrating hole has a width of larger than 0 um and less than 300 um. A height between a bottom surface of the transparent optical glue layer and a top surface of the third conduction pad above is larger than 0 um and less than 30 um. The third conduction layer has the largest thickness larger than the height. The first conduction layer and the second conduction layer are transparent conduction layers. The transparent conduction layers comprise ITO. The first conduction pads, the first conduction wires, the second conduction pads, the third conduction pads, the third conduction layer comprise metal or ITO. The first transparent substrate and the second transparent substrate are transparent insulation substrates.

Below, the embodiments are described in detail in cooperation with the drawings to make easily understood the technical contents, characteristics and accomplishments of the present invention.

DETAILED DESCRIPTION OF THE INVENTION

Figure 1:
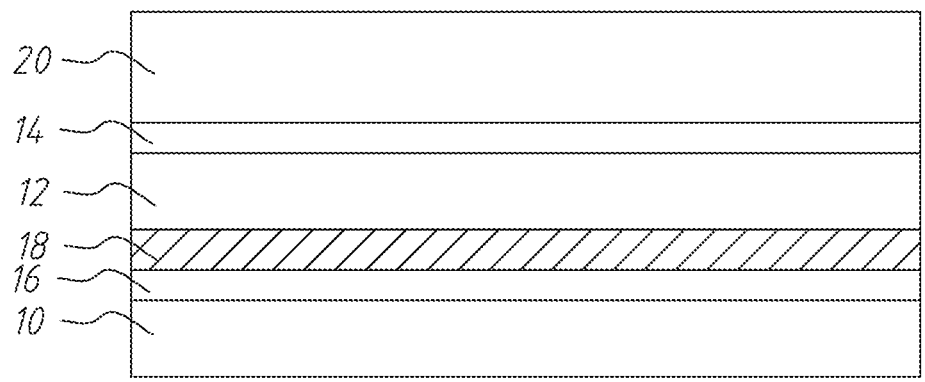
FIG. 1 is a sectional view showing a double indium tin oxide (ITO) structure in the conventional technology.
Figure 2:
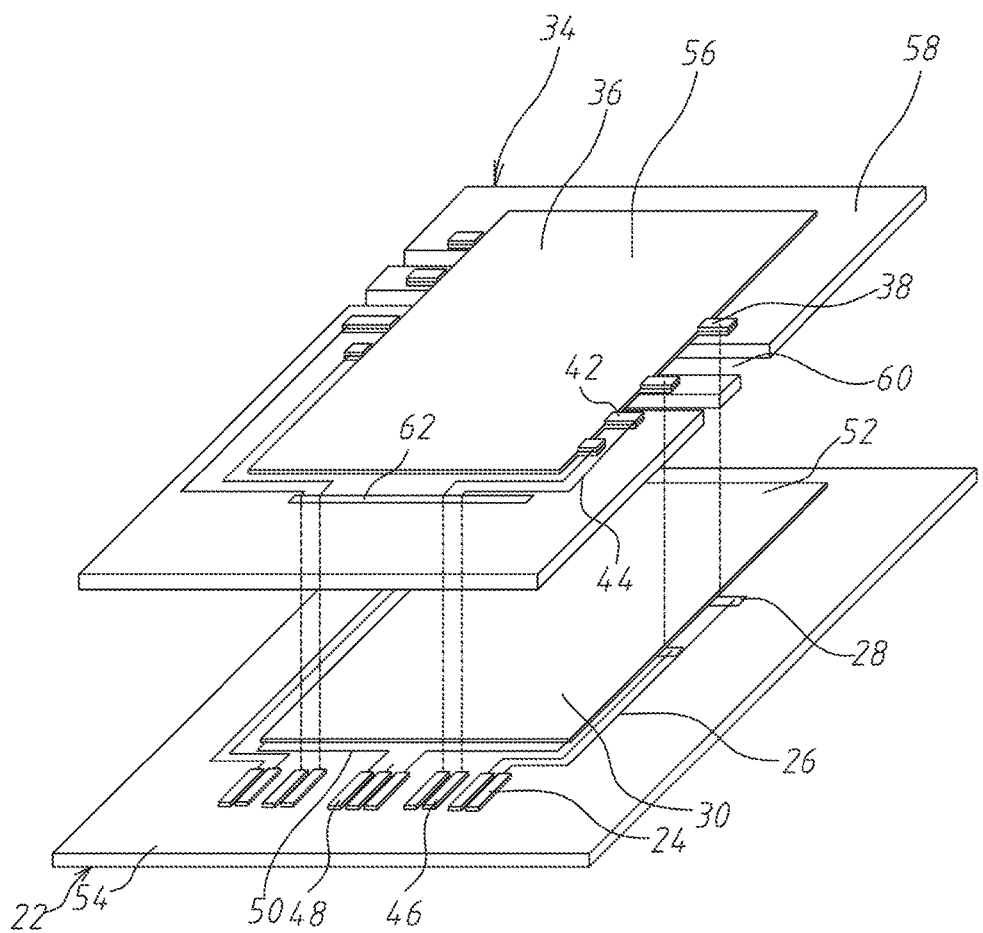
FIG. 2 is a diagram schematically showing connection relationship and positions of a first transparent substrate, first conduction pads, first conduction wires, second conduction pads, a first conduction layer, a second transparent substrate, a second conduction layer, third conduction pads, fourth conduction pads, second conduction wires, and fifth conduction pads according to an embodiment of the present invention.
Figure 3:
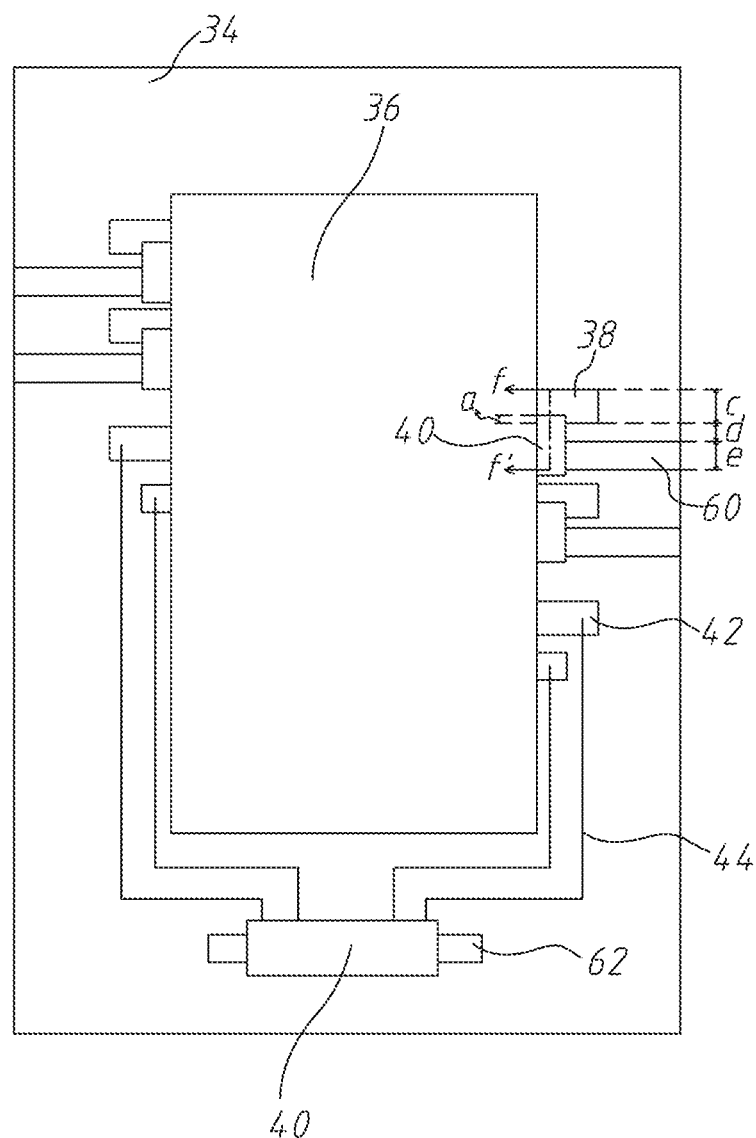
FIG. 3 is a top view showing a touch panel according to the first embodiment of the present invention.
Figure 4:
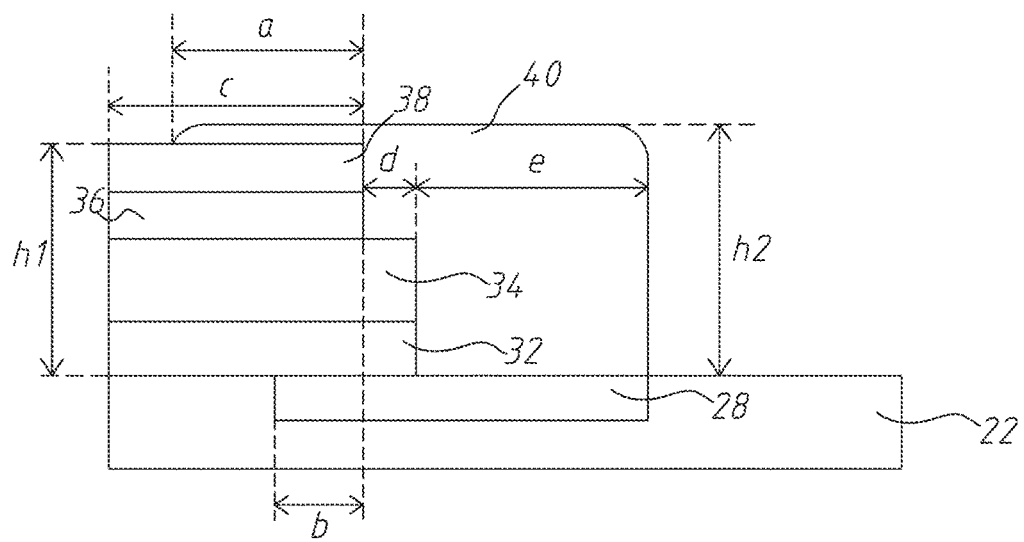
FIG. 4 is a sectional view taken along Line f-f' of FIG. 3.

Below is a touch panel for narrowing bezel region according to the first embodiment of the present invention. Refer to FIG. 2, FIG. 3 and FIG. 4. The touch panel comprises a first transparent substrate 22, a plurality of first conduction pads 24, a plurality of first conduction wires 26, a plurality of second conduction pads 28, a first conduction layer 30, a transparent optical glue layer 32, a second transparent substrate 34, a second conduction layer 36, a plurality of third conduction pads 38, a third conduction layer 40, a plurality of fourth conduction pads 42, a plurality of second conduction wires 44, a plurality of fifth conduction pads 46, a plurality of sixth conduction pads 48 and a plurality of third conduction wires 50. The first transparent substrate 22 and the second transparent substrate 34 are transparent insulation substrates. The first conduction pads 24, the first conduction wires 26, the second conduction pads 28, the first conduction layer 30, the second conduction layer 36, the third conduction pads 38, the third conduction layer 40, the fourth conduction pads 42, the second conduction wires 44, the fifth conduction pads 46, the sixth conduction pads 48 and the third conduction wires 50 comprise indium tin oxide (ITO) or metal. The first conduction layer 30 and the second conduction layer 36 are transparent conduction layers. Besides, the first conduction layer 30 comprises a plurality of first transparent electrode serials in parallel to each other in a first direction. The second conduction layer 36 comprises a plurality of second transparent electrode serials in parallel to each other in a second direction vertical the first direction. A top surface of the first transparent substrate 22 has a first sensing region 52 and a first bezel region 54 surrounding the first sensing region. The first bezel region 54 is provided with the first conduction pads 24, the first conduction wires 26 and the second conduction pads 28. The first conduction pads 24 are respectively connected with the second conduction pads 28 respectively through the first conduction wires 26. The first conduction layer 30 is arranged on the first sensing region 52. The transparent optical glue layer 32 is arranged on the first conduction layer 30 and the first transparent substrate 22. The second transparent substrate 34 is arranged on the transparent optical glue layer 32, and a top surface of the second transparent substrate 34 has a second sensing region 56 and a second bezel region 58 surrounding the second sensing region 56, and the second bezel region 58 is penetrated with a plurality of penetrating holes 60, and the penetrating holes 60 are respectively arranged over the second conduction pads 28. The second conduction layer 36 is arranged on the second sensing region 56, and the second bezel region 58 is provided with the third conduction pads 38 respectively neighboring the penetrating holes 60 and connected with the second conduction layer 36. The third conduction pads 38 and the penetrating holes 60 are arranged in an alternative way. The second conduction layer 36 extends to the second bezel region 58, and the second conduction layer 36 is arranged between the third conduction pads 38 and the second transparent substrate 34. The third conduction layer 40 is arranged on the third conduction pads 38 and fills the penetrating holes 60, and the second conduction pads 28 are respectively connected with the third conduction pads 38 through the third conduction layer 40 in the penetrating holes 60.

The second bezel region 58 is provided with the fourth conduction pads 42 and the second conduction wires 44, and the second conduction layer 36 extends to the second bezel region 58, and the second conduction layer 36 is arranged between the fourth conduction pads 42 and the second transparent substrate 34, and the second bezel region 58 is penetrated with a penetrating opening 62, and the first bezel region 54 is provided with the fifth conduction pads 46, and a position of the penetrating opening 62 corresponds to the positions of the fifth conduction pads 46, and the fourth conduction pads 42 are connected with the penetrating opening 62 respectively through the second conduction wires 44, and the third conduction layer 40 fills the penetrating opening 62, and the second conduction wires 44 are respectively connected with the fifth conduction pads 46 through the third conduction layer 40 in the penetrating opening 62. Besides, the sixth conduction pads 48 are connected with the first conduction layer 30 respectively through the third conduction wires 50.

In the conventional technology, either of the first transparent substrate 22 and the second transparent substrate 34 is provided with wires with a single layer thereon. However, the second transparent substrate 34 of the present invention is bored to have the penetrating holes 60, and the present invention uses conduction material as conduction mediums between upper and lower conduction wires lapping over each other, so as to form lapping wires with double layers. For example, when the conventional technology installs wires on the second transparent substrate 34, the second bezel region 58 is designed to be wider due to the more second conduction wires. On the contrary, since the third conduction layer 40 of the present invention is connected with the second conduction pads 28 and the third conduction pads 30 through the penetrating holes 60, the wires on the second transparent substrate 34 are shared out between the second transparent substrate 34 and the first transparent substrate 22 to reduce a bezel region of each plane, thereby achieving the requirement for narrowing bezel.

Each penetrating hole 60, each second conduction pad 28 and each third conduction pad 30 have shapes of, but not limited to, rectangles. Long sides of each second conduction pad 28 are vertical to the first sensing region 52, and long sides of each third conduction pad 38 are vertical to the second sensing region 56, and the neighboring rectangles are parallel to each other. For size design, the third conduction layer 40 has a width a of larger than 60 um overlapping each third conduction pad 38 in a direction from the penetrating hole 60 to the third conduction pad 38. Each third conduction pad 38 has a width b of larger than 100 um overlapping the second conduction pad 28 corresponded thereof. Each third conduction pad 38 has a width c of larger than 80 um. The nearest horizontal distance d between each penetrating hole 60 and the third conduction pad 38 neighboring thereto is larger than 80 um. Each penetrating hole 60 has a width e of larger than 0 um and less than 300 um. A height h1 between a bottom surface of the transparent optical glue layer 32 and a top surface of the third conduction pad 38 above is larger than 0 um and less than 30 um. The third conduction layer 40 has the largest thickness h2 larger than the height h1.

Figure 5:
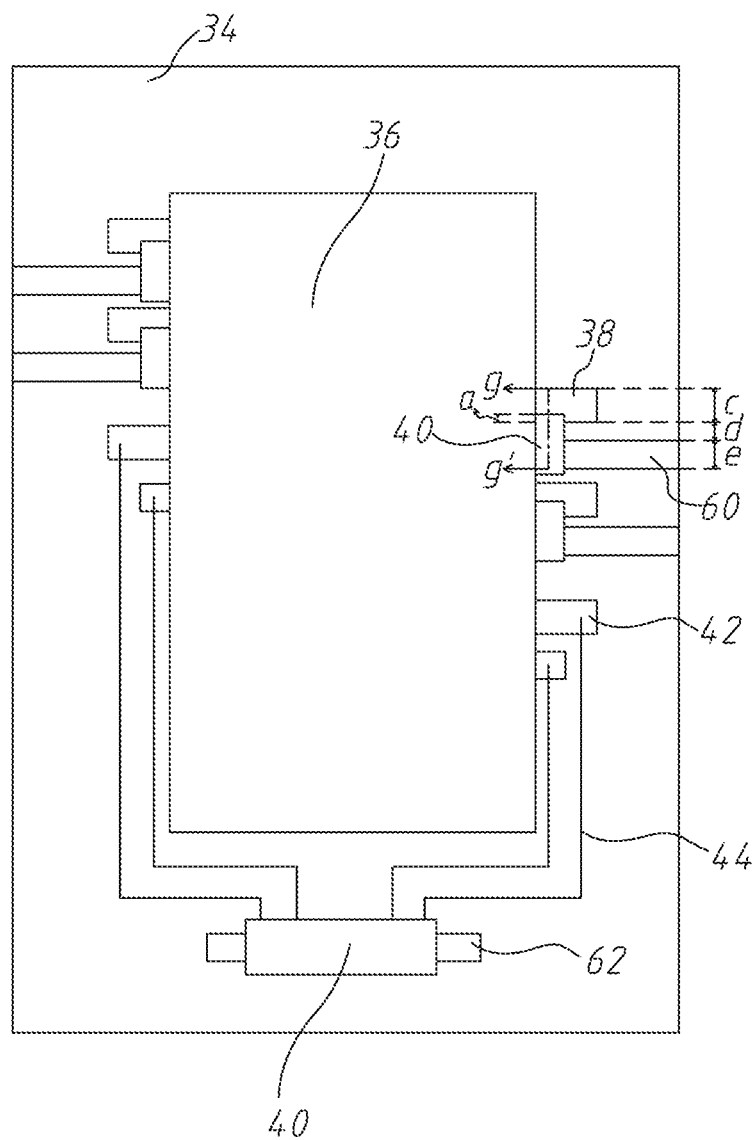
FIG. 5 is a top view showing a touch display device according to the second embodiment of the present invention.
Figure 6:
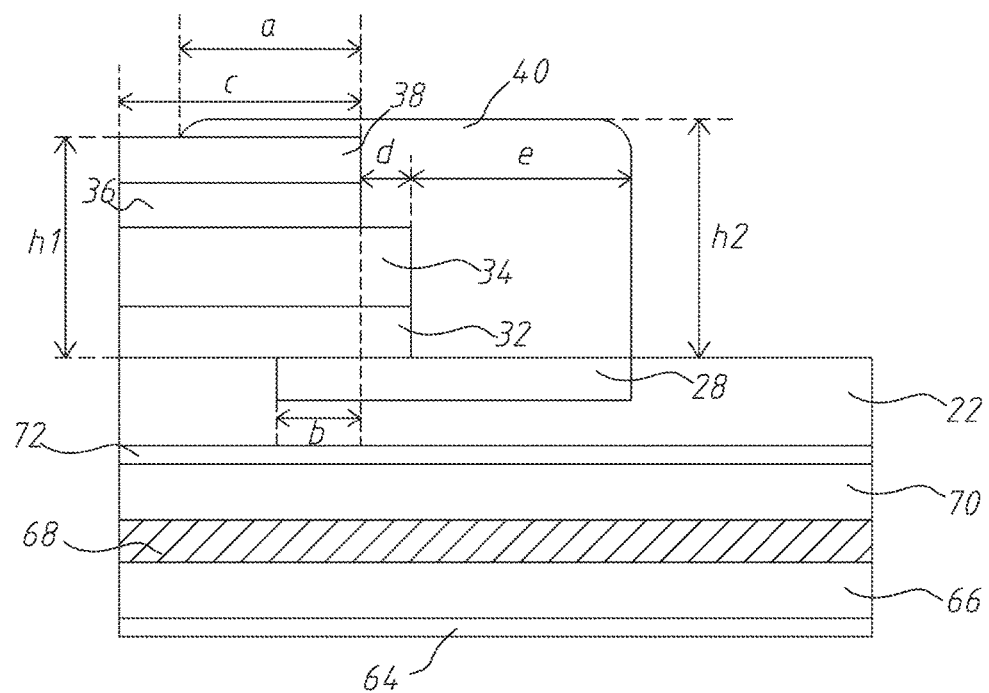
FIG. 6 is a sectional view taken along Line g-g' of FIG. 5.

Below is a touch display device for narrowing bezel region according to the second embodiment of the present invention. Refer to FIG. 2, FIG. 5 and FIG. 6. The touch display device comprises a first polarizer 64, a lower transparent substrate 66, a liquid crystal layer 68, an upper transparent substrate 70, a second polarizer 72, a first transparent substrate 22, a plurality of first conduction pads 24, a plurality of first conduction wires 26, a plurality of second conduction pads 28, a first conduction layer 30, a transparent optical glue layer 32, a second transparent substrate 34, a second conduction layer 36, a plurality of third conduction pads 38, a third conduction layer 40, a plurality of fourth conduction pads 42, a plurality of second conduction wires 44, a plurality of fifth conduction pads 46, a plurality of sixth conduction pads 48 and a plurality of third conduction wires 50. The first transparent substrate 22 and the second transparent substrate 34 are transparent insulation substrates. The first conduction pads 24, the first conduction wires 26, the second conduction pads 28, the first conduction layer 30, the second conduction layer 36, the third conduction pads 38, the third conduction layer 40, the fourth conduction pads 42, the second conduction wires 44, the fifth conduction pads 46, the sixth conduction pads 48 and the third conduction wires 50 comprise indium tin oxide (ITO) or metal. The first conduction layer 30 and the second conduction layer 36 are transparent conduction layers. Besides, the first conduction layer 30 comprises a plurality of first transparent electrode serials in parallel to each other in a first direction. The second conduction layer 36 comprises a plurality of second transparent electrode serials in parallel to each other in a second direction vertical the first direction. The first polarizer 64 and the liquid crystal layer 68 are respectively arranged on a bottom surface and a top surface of the lower transparent substrate 66. The upper transparent substrate 70, the second polarizer 72 and the first transparent substrate 22 are sequentially arranged on the liquid crystal layer 68.

A top surface of the first transparent substrate 22 has a first sensing region 52 and a first bezel region 54 surrounding the first sensing region. The first bezel region 54 is provided with the first conduction pads 24, the first conduction wires 26 and the second conduction pads 28. The first conduction pads 24 are respectively connected with the second conduction pads 28 respectively through the first conduction wires 26. The first conduction layer 30 is arranged on the first sensing region 52. The transparent optical glue layer 32 is arranged on the first conduction layer 30 and the first transparent substrate 22. The second transparent substrate 34 is arranged on the transparent optical glue layer 32, and a top surface of the second transparent substrate 34 has a second sensing region 56 and a second bezel region 58 surrounding the second sensing region 56, and the second bezel region 58 is penetrated with a plurality of penetrating holes 60, and the penetrating holes 60 are respectively arranged over the second conduction pads 28. The second conduction layer 36 is arranged on the second sensing region 56, and the second bezel region 58 is provided with the third conduction pads 38 respectively neighboring the penetrating holes 60 and connected with the second conduction layer 36. The third conduction pads 38 and the penetrating holes 60 are arranged in an alternative way. The second conduction layer 36 extends to the second bezel region 58, and the second conduction layer 36 is arranged between the third conduction pads 38 and the second transparent substrate 34. The third conduction layer 40 is arranged on the third conduction pads 38 and fills the penetrating holes 60, and the second conduction pads 28 are respectively connected with the third conduction pads 38 through the third conduction layer 40 in the penetrating holes 60.

The second bezel region 58 is provided with the fourth conduction pads 42 and the second conduction wires 44, and the second conduction layer 36 extends to the second bezel region 58, and the second conduction layer 36 is arranged between the fourth conduction pads 42 and the second transparent substrate 34, and the second bezel region 58 is penetrated with a penetrating opening 62, and the first bezel region 54 is provided with the fifth conduction pads 46, and a position of the penetrating opening 62 corresponds to the positions of the fifth conduction pads 46, and the fourth conduction pads 42 are connected with the penetrating opening 62 respectively through the second conduction wires 44, and the third conduction layer 40 fills the penetrating opening 62, and the second conduction wires 44 are respectively connected with the fifth conduction pads 46 through the third conduction layer 40 in the penetrating opening 62. Besides, the sixth conduction pads 48 are connected with the first conduction layer 30 respectively through the third conduction wires 50.

In the conventional technology, either of the first transparent substrate 22 and the second transparent substrate 34 is provided with wires with a single layer thereon. However, the second transparent substrate 34 of the present invention is bored to have the penetrating holes 60, and the present invention uses conduction material as conduction mediums between upper and lower conduction wires lapping over each other, so as to form lapping wires with double layers. For example, when the conventional technology installs wires on the second transparent substrate 34, the second bezel region 58 is designed to be wider due to the more second conduction wires. On the contrary, since the third conduction layer 40 of the present invention is connected with the second conduction pads 28 and the third conduction pads 30 through the penetrating holes 60, the wires on the second transparent substrate 34 are shared out between the second transparent substrate 34 and the first transparent substrate 22 to reduce a bezel region of each plane, thereby achieving the requirement for narrowing bezel.

Each penetrating hole 60, each second conduction pad 28 and each third conduction pad 30 have shapes of, but not limited to, rectangles. Long sides of each second conduction pad 28 are vertical to the first sensing region 52, and long sides of each third conduction pad 38 are vertical to the second sensing region 56, and the neighboring rectangles are parallel to each other. For size design, the third conduction layer 40 has a width a of larger than 60 um overlapping each third conduction pad 38 in a direction from the penetrating hole 60 to the third conduction pad 38. Each third conduction pad 38 has a width b of larger than 100 um overlapping the second conduction pad 28 corresponded thereof. Each third conduction pad 38 has a width c of larger than 80 um. The nearest horizontal distance d between each penetrating hole 60 and the third conduction pad 38 neighboring thereto is larger than 80 um. Each penetrating hole 60 has a width e of larger than 0 um and less than 300 um. A height h1 between a bottom surface of the transparent optical glue layer 32 and a top surface of the third conduction pad 38 above is larger than 0 um and less than 30 um. The third conduction layer 40 has the largest thickness h2 larger than the height h1.

In conclusion, the present invention uses conduction material as conduction mediums between upper and lower conduction wires lapping over each other, so as to form lapping wires with double layers and to reduce a bezel region of each plane, thereby achieving the requirement for narrowing bezel.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A touch panel for narrowing bezel region comprising:
   a first transparent substrate with a top surface thereof having a first sensing region and a first bezel region surrounding said first sensing region, and said first bezel region is provided with a plurality of first conduction pads, a plurality of first conduction wires and a plurality of second conduction pads, and said first conduction pads are respectively connected with said second conduction pads respectively through said first conduction wires;
   a first conduction layer arranged on said first sensing region;
   a transparent optical glue layer arranged on said first conduction layer and said first transparent substrate;
   a second transparent substrate arranged on said transparent optical glue layer, and a top surface of said second transparent substrate has a second sensing region and a second bezel region surrounding said second sensing region, and said second bezel region is penetrated with a plurality of penetrating holes, and said penetrating holes are respectively arranged over said second conduction pads;
   a second conduction layer arranged on said second sensing region, and said second bezel region is provided with a plurality of third conduction pads respectively neighboring said penetrating holes and connected with said second conduction layer, and said second conduction layer extends to said second bezel region, and said second conduction layer is arranged between said third conduction pads and said second transparent substrate; and
   a third conduction layer arranged on said third conduction pads and filling said penetrating holes, and said second conduction pads respectively connected with said third conduction pads through said third conduction layer in said penetrating holes.

2. The touch panel for narrowing bezel region according to claim 1, wherein said third conduction pads and said penetrating holes are arranged in an alternative way.

3. The touch panel for narrowing bezel region according to claim 1, wherein said second bezel region is provided with a plurality of fourth conduction pads and a plurality of second conduction wires, and said second bezel region is penetrated with a penetrating opening, and said first bezel region is provided with fifth conduction pads, and a position of said penetrating opening corresponds to said positions of said fifth conduction pads, and said fourth conduction pads are connected with said penetrating opening respectively through said second conduction wires, and said third conduction layer fills said penetrating opening, and said second conduction wires are respectively connected with said fifth conduction pads through said third conduction layer in said penetrating opening.

4. The touch panel for narrowing bezel region according to claim 3, wherein said second conduction layer extends to said second bezel region, and said second conduction layer is arranged between said fourth conduction pads and said second transparent substrate.

5. The touch panel for narrowing bezel region according to claim 3, wherein said fourth conduction pads, said second conduction wires and said fifth conduction pads comprise metal or indium tin oxide (ITO).

6. The touch panel for narrowing bezel region according to claim 1, wherein each said penetrating hole, each said second conduction pad and each said third conduction pad have shapes of rectangles, and long sides of each said second conduction pad are vertical to said first sensing region, and long sides of each said third conduction pad are vertical to said second sensing region, and neighboring said rectangles are parallel to each other.

7. The touch panel for narrowing bezel region according to claim 6, wherein said third conduction layer has a width of larger than 60 um overlapping each said third conduction pad in a direction from said penetrating hole to said third conduction pad.

8. The touch panel for narrowing bezel region according to claim 6, wherein each said third conduction pad has a width of larger than 100 um overlapping said second conduction pad corresponded thereof.

9. The touch panel for narrowing bezel region according to claim 6, wherein each said third conduction pad has a width of larger than 80 um.

10. The touch panel for narrowing bezel region according to claim 6, wherein a nearest horizontal distance between each said penetrating hole and said third conduction pad neighboring thereto is larger than 80 um.

11. The touch panel for narrowing bezel region according to claim 6, wherein each said penetrating hole has a width of larger than 0 um and less than 300 um.

12. The touch panel for narrowing bezel region according to claim 1, wherein a height between a bottom surface of said transparent optical glue layer and a top surface of said third conduction pad above is larger than 0 um and less than 30 um.

13. The touch panel for narrowing bezel region according to claim 12, wherein said third conduction layer has a largest thickness larger than said height.

14. The touch panel for narrowing bezel region according to claim 1, wherein said first conduction layer and said second conduction layer are transparent conduction layers.

15. The touch panel for narrowing bezel region according to claim 14, wherein said transparent conduction layers comprise ITO.

16. The touch panel for narrowing bezel region according to claim 1, wherein said first conduction pads, said first conduction wires, said second conduction pads, said third conduction pads, said third conduction layer comprise metal or ITO.

17. The touch panel for narrowing bezel region according to claim 1, wherein said first transparent substrate and said second transparent substrate are transparent insulation substrates.

18. A touch display device comprising:
    a lower transparent substrate;
    a first polarizer arranged on a bottom surface of said lower transparent substrate;
    a liquid crystal layer arranged on a top surface of said lower transparent substrate;
    an upper transparent substrate arranged on said liquid crystal layer;
    a second polarizer arranged on said upper transparent substrate;
    a first transparent substrate arranged on said second polarizer, and a top surface of said first transparent substrate has a first sensing region and a first bezel region surrounding said first sensing region, and said first bezel region is provided with a plurality of first conduction pads, a plurality of first conduction wires and a plurality of second conduction pads, and said first conduction pads are respectively connected with said second conduction pads respectively through said first conduction wires;

a first conduction layer arranged on said first sensing region;

a transparent optical glue layer arranged on said first conduction layer and said first transparent substrate;

a second transparent substrate arranged on said transparent optical glue layer, and a top surface of said second transparent substrate has a second sensing region and a second bezel region surrounding said second sensing region, and said second bezel region is penetrated with a plurality of penetrating holes, and said penetrating holes are respectively arranged over said second conduction pads;

a second conduction layer arranged on said second sensing region, and said second bezel region is provided with a plurality of third conduction pads respectively neighboring said penetrating holes and connected with said second conduction layer, and said second conduction layer extends to said second bezel region, and said second conduction layer is arranged between said third conduction pads and said second transparent substrate; and a third conduction layer arranged on said third conduction pads and filling said penetrating holes, and said second conduction pads respectively connected with said third conduction pads through said third conduction layer in said penetrating holes.

19. The touch display device according to claim 18, wherein said third conduction pads and said penetrating holes are arranged in an alternative way.

20. The touch display device according to claim 18, wherein said second bezel region is provided with a plurality of fourth conduction pads and a plurality of second conduction wires, and said second bezel region is penetrated with a penetrating opening, and said first bezel region is provided with fifth conduction pads, and a position of said penetrating opening corresponds to said positions of said fifth conduction pads, and said fourth conduction pads are connected with said penetrating opening respectively through said second conduction wires, and said third conduction layer fills said penetrating opening, and said second conduction wires are respectively connected with said fifth conduction pads through said third conduction layer in said penetrating opening.

21. The touch display device according to claim 20, wherein said second conduction layer extends to said second bezel region, and said second conduction layer is arranged between said fourth conduction pads and said second transparent substrate.

22. The touch display device according to claim 20, wherein said fourth conduction pads, said second conduction wires and said fifth conduction pads comprise metal or indium tin oxide (ITO).

23. The touch display device according to claim 18, wherein each said penetrating hole, each said second conduction pad and each said third conduction pad have shapes of rectangles, and long sides of each said second conduction pad are vertical to said first sensing region, and long sides of each said third conduction pad are vertical to said second sensing region, and neighboring said rectangles are parallel to each other.

24. The touch display device according to claim 23, wherein said third conduction layer has a width of larger than 60 um overlapping each said third conduction pad in a direction from said penetrating hole to said third conduction pad.

25. The touch display device according to claim 23, wherein each said third conduction pad has a width of larger than 100 um overlapping said second conduction pad corresponded thereof.

26. The touch display device according to claim 23, wherein each said third conduction pad has a width of larger than 80 um.

27. The touch display device according to claim 23, wherein a nearest horizontal distance between each said penetrating hole and said third conduction pad neighboring thereto is larger than 80 um.

28. The touch display device according to claim 23, wherein each said penetrating hole has a width of larger than 0 um and less than 300 um.

29. The touch display device according to claim 18, wherein a height between a bottom surface of said transparent optical glue layer and a top surface of said third conduction pad above is larger than 0 um and less than 30 um.

30. The touch display device according to claim 29, wherein said third conduction layer has a largest thickness larger than said height.

31. The touch display device according to claim 18, wherein said first conduction layer and said second conduction layer are transparent conduction layers.

32. The touch display device according to claim 31, wherein said transparent conduction layers comprise ITO.

33. The touch display device according to claim 18, wherein said first conduction pads, said first conduction wires, said second conduction pads, said third conduction pads, said third conduction layer comprise metal or ITO.

34. The touch display device according to claim 18, wherein said first transparent substrate and said second transparent substrate are transparent insulation substrates.

* * * * *